United States Patent
Chang et al.

(10) Patent No.: US 10,899,355 B2
(45) Date of Patent: Jan. 26, 2021

(54) CRANK VELOCITY DRIVELINE FILTERING FOR CONSECUTIVE MISFIRE DETECTION

(71) Applicants: Jaeyeong Chang, Ann Arbor, MI (US); Richard K Moote, Ann Arbor, MI (US); Arthur J Varady, Chelsea, MI (US); Ilias Anagnostopoulos-Politis, Pinckney, MI (US); Zhe Wang, Farmington Hills, MI (US); Yan Zhang, Auburn Hills, MI (US)

(72) Inventors: Jaeyeong Chang, Ann Arbor, MI (US); Richard K Moote, Ann Arbor, MI (US); Arthur J Varady, Chelsea, MI (US); Ilias Anagnostopoulos-Politis, Pinckney, MI (US); Zhe Wang, Farmington Hills, MI (US); Yan Zhang, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 212 days.

(21) Appl. No.: 16/142,502

(22) Filed: Sep. 26, 2018

(65) Prior Publication Data
US 2020/0094842 A1  Mar. 26, 2020

(51) Int. Cl.
*B60W 30/20* (2006.01)
*F16F 15/00* (2006.01)
*B60W 20/17* (2016.01)

(52) U.S. Cl.
CPC ............ *B60W 30/20* (2013.01); *B60W 20/17* (2016.01); *F16F 15/002* (2013.01); *B60W 2030/206* (2013.01); *B60W 2510/0685* (2013.01); *B60W 2710/08* (2013.01); *B60W 2710/30* (2013.01)

(58) Field of Classification Search
CPC ......... B60W 30/20; B60W 2510/0685; B60W 2510/0638; B60W 2030/206; F16F 15/002
See application file for complete search history.

(56) References Cited

U.S. PATENT DOCUMENTS

| 5,440,922 A | 8/1995 | Ichikawa |
| 5,744,722 A | 4/1998 | Wu et al. |
| 6,112,149 A | 8/2000 | Varady et al. |

(Continued)

OTHER PUBLICATIONS

Reik et al., Dual Mass Flywheel, 1998, The 6th LUK Symposium Professional Articles, pp. 69-91 (Year: 1998).*

*Primary Examiner* — Alan D Hutchinson
*Assistant Examiner* — Andy Schneider
(74) *Attorney, Agent, or Firm* — Ralph E Smith

(57) ABSTRACT

A misfire detection system and method for a vehicle utilize a controller to obtain a crankshaft speed signal indicative of a rotational speed of an engine crankshaft connected to a device that mitigates vibrational disturbances at the crankshaft caused by misfires of the engine, detect that a first firing event of the engine is a first misfire based on the crankshaft speed signal, monitor a vibrational response of the crankshaft, detect that a consecutive second firing event of the engine is a second misfire based on a first modified crankshaft speed signal and the first set of thresholds, and in response to detecting the second misfire, reset the monitoring of the vibrational response of the crankshaft including modifying the amplitude of the crankshaft speed signal to obtain a second modified crankshaft speed signal and comparing the second modified crankshaft speed signal to a set of thresholds.

20 Claims, 4 Drawing Sheets

(56) References Cited

U.S. PATENT DOCUMENTS

| | | |
|---|---|---|
| 7,467,033 B2 | 12/2008 | Miller et al. |
| 7,543,483 B2 | 6/2009 | Akimoto et al. |
| 7,571,640 B2 | 8/2009 | Andrews |
| 7,937,992 B2 | 5/2011 | Akimoto et al. |
| 10,005,469 B2 | 6/2018 | Guo et al. |
| 2009/0065275 A1* | 3/2009 | Akimoto ............ G01M 15/11 180/65.28 |
| 2009/0271099 A1 | 10/2009 | Jones et al. |
| 2010/0114460 A1 | 5/2010 | Akimoto |
| 2016/0169141 A1 | 6/2016 | Flynn et al. |
| 2017/0355376 A1* | 12/2017 | Guo ................ B60W 10/10 |

\* cited by examiner

CRANK VELOCITY DRIVELINE FILTERING FOR CONSECUTIVE MISFIRE DETECTION

FIELD

The present application generally relates to engine misfire detection and, more particularly, to systems and methods for detection of consecutive engine misfires.

BACKGROUND

Some vehicles have devices that react to torque changes with a transient response. Non-limiting examples of this include an electric motor coupled to an engine crankshaft in a hybrid electric vehicle (HEV) and a dual mass damper flywheel, such as in a manual transmission vehicle. The vehicle's engine combusts an air/fuel mixture to generate drive torque at the crankshaft. The electric motor and the dual mass damper flywheel both act as a damper to torque disturbances at the crankshaft, such as those caused by an engine misfire. Misfires of the engine are typically detected based on a crankshaft speed signal.

These sources of vibrational responses (the dual mass damper flywheel, the electric motor active damping, an overall soft-stiffness design of connections between the engine and other components, etc.), however, often cause a smaller separation or distinction in the crankshaft speed signal between normal and misfire events. Thus, engine misfire detection could be negatively affected with such an arrangement by detecting false positives and false negatives. Accordingly, while such engine misfire detection systems do work for their intended purpose, there remains a need for improvement in the relevant art.

SUMMARY

According to one example aspect of the invention, a misfire detection system for a vehicle is presented. In one exemplary implementation, the system comprises: a crankshaft position sensor configured to generate a crankshaft speed signal indicative of a rotational speed of a crankshaft of an engine of the vehicle, wherein the crankshaft is connected to a device that mitigates vibrational disturbances at the crankshaft caused by misfires of the engine, and a controller configured to: detect that a first firing event of the engine is a first misfire based on the crankshaft speed signal, in response to detecting the first misfire, monitor a vibrational response of the crankshaft including modifying an amplitude of the crankshaft speed signal to obtain a first modified crankshaft speed signal and comparing the first modified crankshaft speed signal to a first set of thresholds, detect that a consecutive second firing event of the engine is a second misfire based on the first modified crankshaft speed signal and the first set of thresholds, and in response to detecting the second misfire, reset the monitoring of the vibrational response of the crankshaft including modifying the amplitude of the crankshaft speed signal to obtain a second modified crankshaft speed signal and comparing the second modified crankshaft speed signal to a second set of thresholds.

In some implementations, the controller is further configured to determine whether a consecutive third firing event of the engine is a third misfire based on the second modified crankshaft speed signal and the second set of thresholds. In some implementations, the resetting causes a shift or delay in the monitoring of the vibrational response of the crankshaft to prevent at least one of a false positive misfire detection and a false negative misfire detection. In some implementations, the first and second sets of thresholds are the same. In some implementations, the first and second sets of thresholds are different and are each calibrated based on empirical data.

In some implementations, the device comprises at least one of an electric motor connected to the crankshaft and a dual mass damper flywheel connected to the crankshaft. In some implementations, the vehicle is a hybrid electric vehicle (HEV) comprising only the electric motor connected to the crankshaft. In some implementations, the vehicle is an HEV comprising the dual mass damper flywheel connected between the crankshaft and the electric motor. In some implementations, the controller is further configured to control the electric motor to mitigate the vibrational disturbances at the crankshaft in response to detecting each of the first and second misfires. In other implementations, the vehicle is a manual transmission vehicle having only the dual mass damper connected between the crankshaft and a manual transmission.

According to another example aspect of the invention, a misfire detection method for a vehicle is presented. In one exemplary implementation, the method comprises: obtaining, by a controller and using a crankshaft position sensor, a crankshaft speed signal indicative of a rotational speed of a crankshaft of an engine of the vehicle, wherein the crankshaft is connected to a device that mitigates vibrational disturbances at the crankshaft caused by misfires of the engine, detecting, by the controller, that a first firing event of the engine is a first misfire based on the crankshaft speed signal, in response to detecting the first misfire, monitoring, by the controller, a vibrational response of the crankshaft including modifying an amplitude of the crankshaft speed signal to obtain a first modified crankshaft speed signal and comparing the first modified crankshaft speed signal to a first set of thresholds, detecting, by the controller, that a consecutive second firing event of the engine is a second misfire based on the first modified crankshaft speed signal and the first set of thresholds, and in response to detecting the second misfire, resetting, by the controller, the monitoring of the vibrational response of the crankshaft including modifying the amplitude of the crankshaft speed signal to obtain a second modified crankshaft speed signal and comparing the second modified crankshaft speed signal to a second set of thresholds.

In some implementations, the method further comprises determining, by the controller, whether a consecutive third firing event of the engine is a third misfire based on the second modified crankshaft speed signal and the second set of thresholds. In some implementations, the resetting causes a shift or delay in the monitoring of the vibrational response of the crankshaft to prevent at least one of a false positive misfire detection and a false negative misfire detection. In some implementations, the first and second sets of thresholds are the same. In some implementations, the first and second sets of thresholds are different and are each calibrated based on empirical data.

In some implementations, the device comprises at least one of an electric motor connected to the crankshaft and a dual mass damper flywheel connected to the crankshaft. In some implementations, the vehicle is an HEV comprising only the electric motor connected to the crankshaft. In some implementations, the vehicle is an HEV comprising the dual mass damper flywheel connected between the crankshaft and the electric motor. In some implementations, the method further comprises controlling, by the controller, the electric motor to mitigate the vibrational disturbances at the crankshaft in response to detecting each of the first and second misfires. In other implementations, the vehicle is a manual transmission vehicle having only the dual mass damper connected between the crankshaft and a manual transmission.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As previously discussed, some hybrid electric vehicles (HEVs) and manual transmission vehicles include sources that negatively affect the performance of conventional engine misfire detection. These sources include, but are not limited to, (i) a dual mass flywheel coupling a crankshaft of an engine to a manual transmission, (ii) an electric motor coupled to the engine crankshaft in an HEV and actively operating as a damper to fluctuations in a crankshaft speed signal, and (iii) an overall soft stiffness design of connections between the engine and other components. More particularly, each of these sources causes large vibrational responses that affect the crankshaft speed signal and thereby affect engine misfire detection.

False positives and false fails for engine misfire detection could potentially increase emissions and/or warranty costs. As a result, there is a need for improved misfire detection. These techniques involve modifying an amplitude of the crankshaft speed signal in response to a detected misfire and comparing the modified crankshaft speed signal to a set of thresholds corresponding to an expected vibrational response of the crankshaft. When two or more consecutive misfires occur, however, these techniques continue monitoring the crankshaft vibrational response relative to the first detected misfire. This could result in false positives and/or false fails as discussed above.

Accordingly, improved misfire detection systems and methods are presented. These techniques implemented by these systems and methods effectively delay or shift the crankshaft vibrational response monitoring until the last of the consecutive misfire events. In other words, the crankshaft vibrational response monitoring does not begin or is otherwise reset upon the detection of a consecutive misfire event. This is because the subsequent misfire event should cause the same vibrational disturbance to the crankshaft as the previous misfire event. This allows for the techniques to be capable of detecting at least two consecutive misfires. The same or different sets of thresholds could be used for monitoring the crankshaft vibrational response after a single misfire compared to multiple consecutive misfires. The same or different sets of thresholds could also be used for monitoring different quantities of consecutive misfires.

Figure 1:
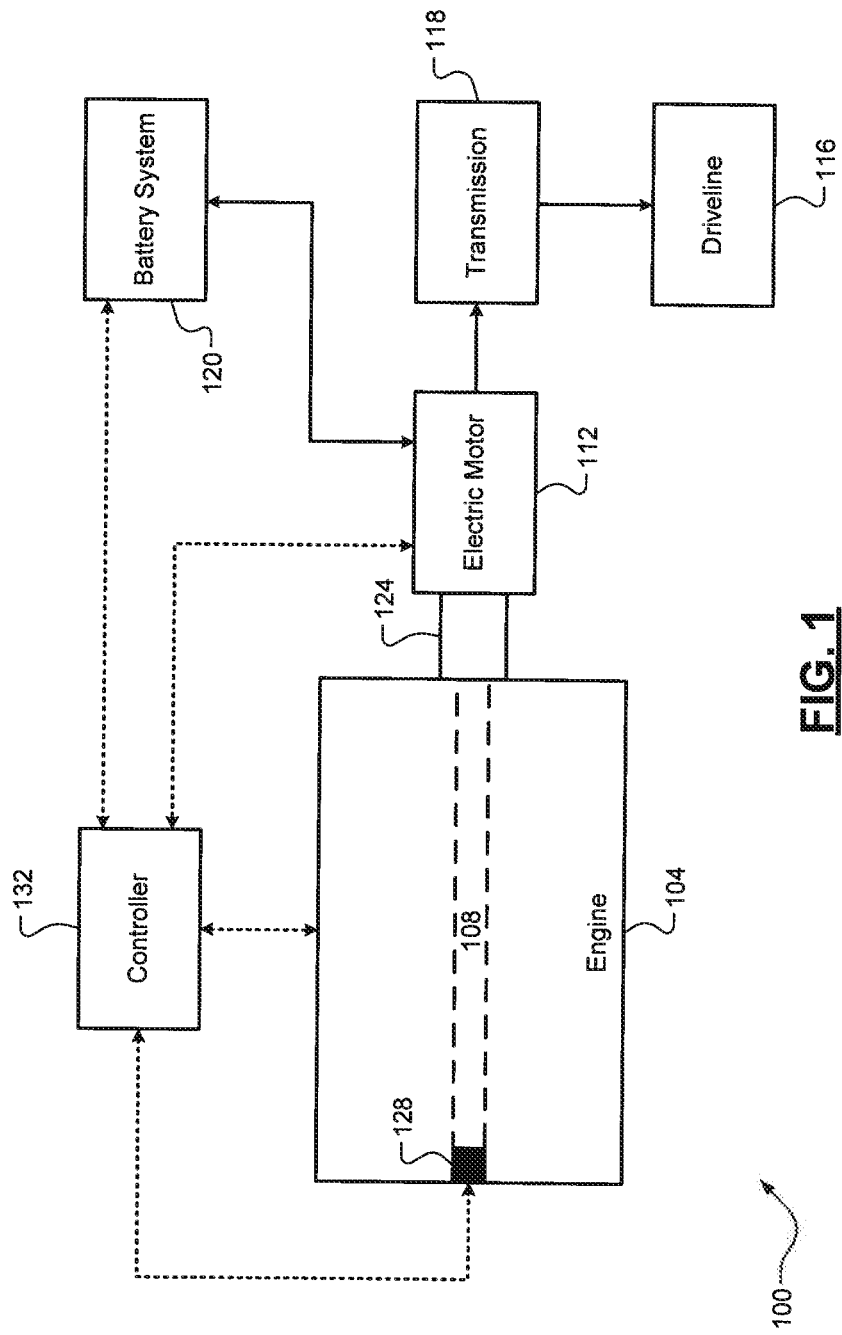
FIG. 1 is a diagram of an example hybrid electric vehicle (HEV) according to the principles of the present disclosure.

Referring now to FIG. 1, a diagram of an example HEV 100 is illustrated. One example of the HEV is a plug-in HEV (PHEV), but it will be appreciated that the HEV 100 could be any suitable HEV or other type of vehicle that comprises one or more above-mentioned sources that act to mitigate crankshaft disturbances and thereby negatively affect engine misfire detection (e.g., a manual transmission vehicle having a dual mass damper flywheel), as well as combinations thereof (e.g., an HEV having an electric motor with a dual mass damper flywheel connecting the engine crankshaft to the electric motor). The HEV 100 includes an internal combustion engine 104 configured to combust a mixture of air and fuel (gasoline, diesel, etc.) to generate drive torque at a crankshaft 108. The HEV 100 also optionally includes an electric motor 112 configured to generate drive torque for transfer to a driveline 116 of the HEV 100 via a transmission 118. In some implementations, the HEV 100 also includes a battery system 120 configured to provide an electrical current to drive the electric motor 112. The electric motor 112 is optionally coupled to the crankshaft 108 via a dual mass damper flywheel 124 (hereinafter, "flywheel 124"). The transmission 118 could be, for example, a hybrid transmission (e.g., an automatic transmission having two electric motors therein) or a manual transmission.

As discussed above, it will be appreciated that the vehicle 100 could include only the dual mass damper flywheel 124 and not the electric motor 112, such as in a manual transmission vehicle configuration. This dual mass damper configuration provides for vibration reduction by accumulating stored energy into two flywheel half-masses over a period of time while simultaneously mitigating vibration at a comparable rate via a series of springs, which is subsequently releasable at a much higher rate. The flywheel 124 is configured to transfer drive torque from the crankshaft 108 to the electric motor 112, and vice-versa. While the techniques of the present disclosure are described with respect to HEVs, it will be appreciated that these techniques could be implemented in any vehicle comprising an engine and at least one crankshaft damper source (dual mass damper flywheel, an electric motor, etc.). A crankshaft sensor 128 is configured to measure a rotational position of or a rotational speed of the crankshaft 108. In one exemplary implementation, the crankshaft sensor 128 is a Hall effect sensor configured to measure a rotational position of a toothed wheel coupled to the crankshaft 108.

In one exemplary implementation, the crankshaft sensor 128 is a crankshaft position sensor that measures a rotational position (e.g., a crankshaft angle). These measurements could be discrete samples at a median sampling rate. A controller 132 could then calculate crankshaft speed (e.g., in revolutions per minute, or RPM) based on the sampled data. In one exemplary implementation, the calculated crankshaft speeds are normalized such that normal firing events have a normalized crankshaft speed of approximately zero, but misfire events have a normalized crankshaft speed of approximately negative 0.2 or less. By normalizing the crankshaft speed as discussed, the controller 132 is able to better discern between normal firing events and misfire events. In such implementations, the normalized crankshaft speed represents the crankshaft speed signal, prior to any amplitude modification.

The controller 132 is also configured to control operation of the HEV 100, including controlling the engine 104 (air, fuel, spark, etc.) and/or the electric motor 112 (e.g., via an electrical current supplied by the battery system) to produce a desired drive torque at the drivetrain 116. In some implementations, in response to a disturbance at the crankshaft 108, the controller 132 is configured to control the electric motor 112 to provide torque to the crankshaft 108 to counteract and thereby mitigate the disturbance at the crankshaft. This torque generated by the electrical motor 112 could be in either rotational direction, depending on the desired mitigation. This torque is also referred to as a vibrational response provided by the electric motor 112 to the crankshaft. The controller 132 is also configured to utilize the crankshaft speed signal to perform at least a portion of the misfire detection techniques of the present disclosure, which will now be described in greater detail below.

Figure 2:
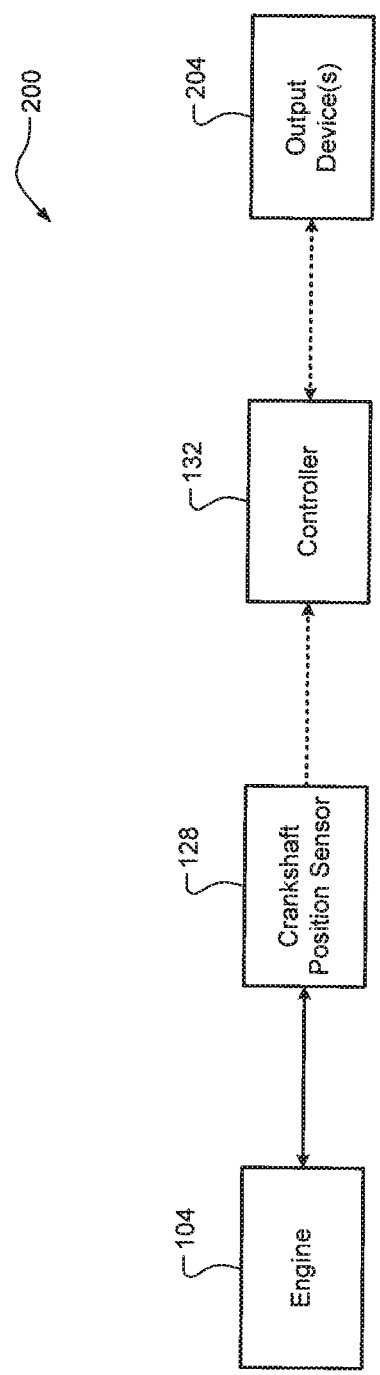
FIG. 2 is a diagram of an example misfire detection system for an HEV according to the principles of the present disclosure.

Referring now to FIG. 2, a diagram of an example misfire detection system 200 for the HEV 100 is illustrated. This misfire detection system 200 comprises the crankshaft position sensor 128, the controller 132, and one or more output devices 204. The controller 132 utilizes the crankshaft position sensor 128 to obtain a crankshaft speed signal, which it then utilizes to detect misfires of the engine 104. In response to detecting one or more misfires, the controller 132 can output information to one or more output devices 204. Non-limiting examples of these output device(s) 204 include a memory, such as a non-volatile memory (NVM), and a malfunction indicator lamp (MIL). While shown as being separate, it will be appreciated that at least some of the output device(s) 204 could be integrated in the controller 132 (e.g., a memory). For example only, the controller 132 could store detected misfires at the memory and, after a certain number of detected misfires over time, the controller 132 could then generate a malfunction signal to activate the MIL.

Figure 3:
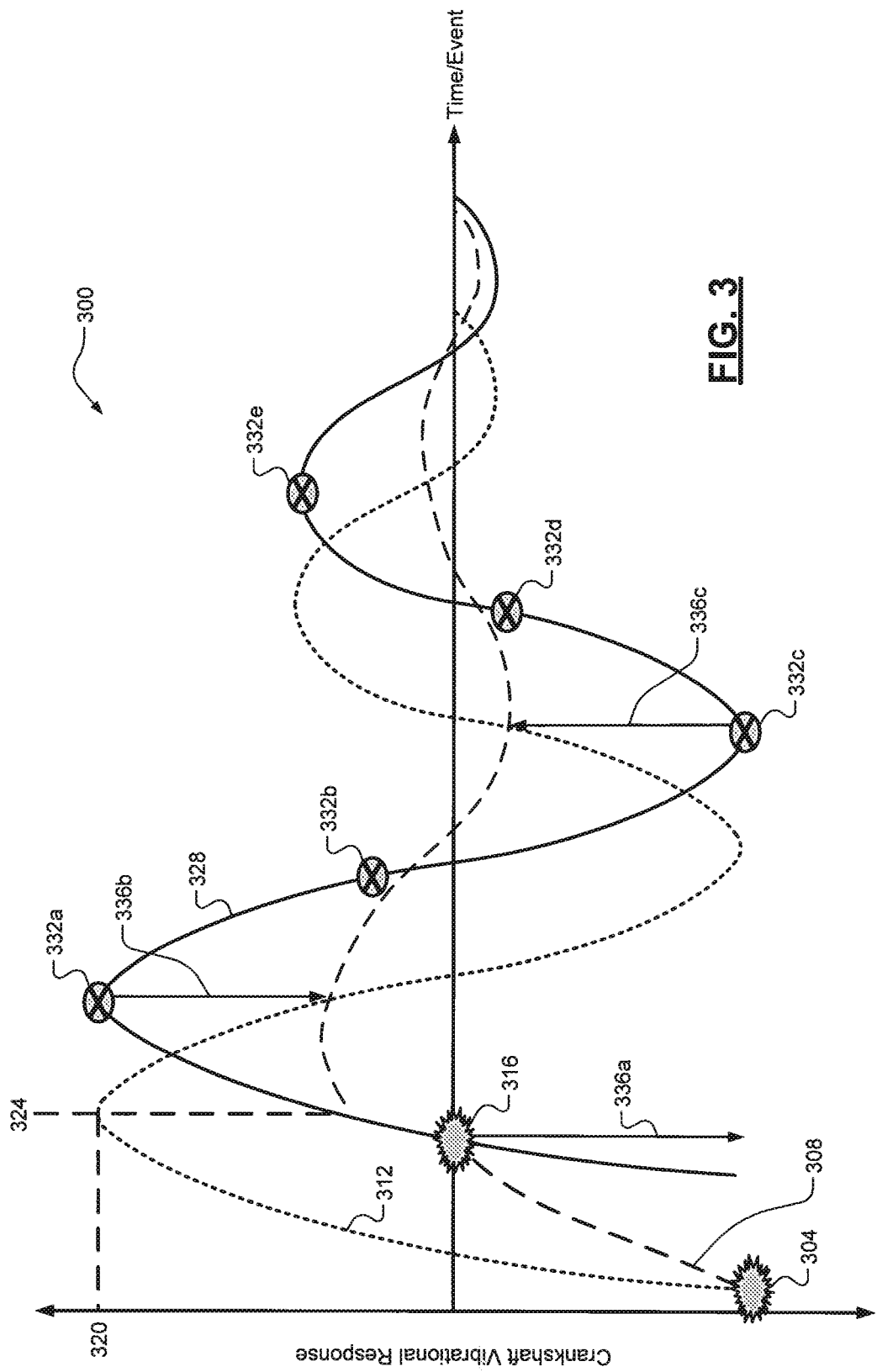
FIG. 3 is a plot of an example crankshaft vibrational response for consecutive misfires according to the principles of the present disclosure.

Referring now to FIG. 3, a plot 300 of an example crankshaft vibrational response after two consecutive misfire events is illustrated. The horizontal axis of the plot 300 represents time or engine firing events and the vertical axis represents the crankshaft vibrational response (e.g., speed fluctuation). At 304, a first engine misfire occurs. Monitoring is then performed during which the crankshaft vibrational response is expected to directly or approximately follow waveform 312. However, the actual crankshaft vibrational response, as shown by waveform 308, fails to track expected waveform 312 due to a second consecutive engine misfire at 316. Thus, the actual crankshaft vibrational response 308 never achieves an expected threshold of 320 at time 324. If this expected waveform 312 were continued to be used for crankshaft vibrational response monitoring after the second engine misfire 316, there could be false positive and/or false negative misfire detection(s).

It will be appreciated that the monitoring of the crankshaft vibrational response as described herein could include modifying the amplitude of the crankshaft speed signal and then comparing the modified crankshaft speed signal to a respective set of thresholds. This amplitude modification is performed because the crankshaft disturbances caused by engine misfires are being mitigated and the vibrational response causes crankshaft velocity disturbances. Thus, the amplitude of the crankshaft speed signal must be modified to account for this vibrational response for the purpose of misfire detection. This modification could include, for example, multiplying the crankshaft speed signal by various coefficients as described below and/or modifying the crankshaft speed signal by various offset values.

As a result of the consecutive misfire detections, the response amplitude modification is delayed or shifted with respect to the second consecutive engine misfire at 316 and is represented by expected waveform 328. This expected waveform 328 is then used thereafter for crankshaft vibrational response monitoring. This process is also referred to herein as "resetting" the crankshaft vibrational response monitoring. After the second consecutive engine misfire at 316, the actual crankshaft vibrational response 308 would be expected to achieve thresholds 332a, 332b, 332c, 332d, and 332e. However, because there is vibrational response mitigation occurring, response amplitude modification must be performed. As shown, this includes modifying the amplitude by coefficients 336a, 336b, 336c, etc.

It will be appreciated that this process could be repeated for any number of consecutive engine misfires, up to N/2 consecutive engine misfires, where N is the total number of engine cylinders. It will be appreciated that the thresholds utilized for monitoring the crankshaft vibrational response could be the same or could be different. Thus, the "resetting" procedure could involve both the delay or shift of the expected waveform in addition to an adjustment in the amplitude/thresholds of the expected waveform as described above. For example, the thresholds utilized after a single misfire could be different than the thresholds utilized after two consecutive misfires, and the thresholds utilized after three consecutive misfires could also be different, and so on and so forth. The specific thresholds could be calibrated, for example, based on empirical test data, e.g., gathered during dynamometer testing of the vehicle.

Figure 4:
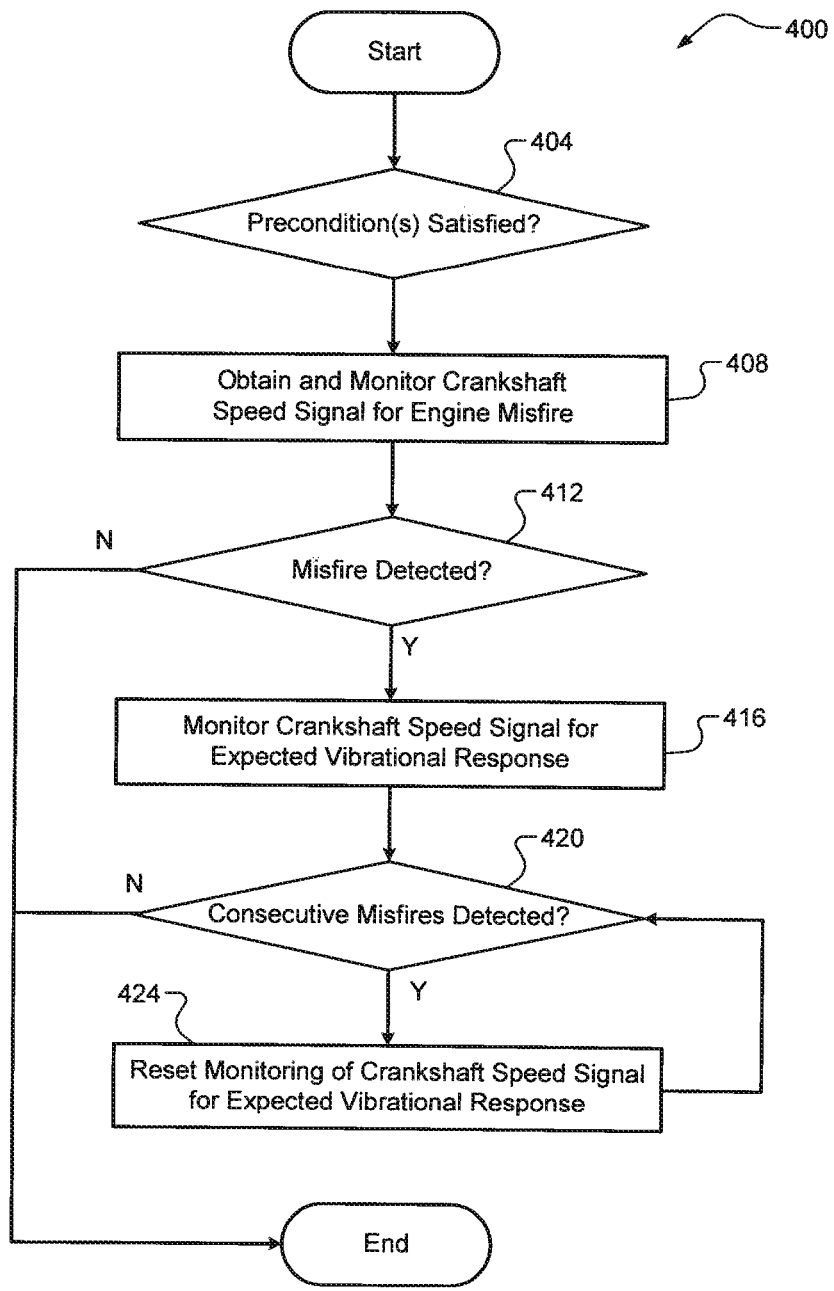
FIG. 4 is a flow diagram of an example misfire detection method for an HEV according to the principles of the present disclosure.

Referring now to FIG. 4, a flow diagram of an example misfire detection method 400 is illustrated. At 404, the controller 132 optionally determines whether a set of one or more preconditions are satisfied. This could include, for example only, the engine 104 running and there being no other malfunctions detected. At 408, the controller 132 obtains the crankshaft speed signal and monitors the signal for a first engine misfire at 412. When the first misfire is detected at 412, the method proceeds to 416. Otherwise, the method 400 ends or returns to 408 for continued misfire detection. At 416, the controller 132 monitors the crankshaft speed signal for an expected vibrational response. As previously discussed, this could include modifying an amplitude of the crankshaft speed signal to obtain a first modified crankshaft speed signal and comparing the first modified crankshaft speed signal to a first set of thresholds. It will be appreciated, however, that response amplitude modification may not be performed until after the next consecutive firing event is determined to be a misfire or not.

At 420, based on this comparing, the controller 132 determines whether a second consecutive misfire has occurred. When true, the method 400 proceeds to 434. Otherwise, the method 400 ends or returns to 408 for continued misfire detection. At 424, the controller 132 resets the monitoring of the crankshaft speed signal for the expected vibrational response. As previously discussed, this could include modifying the amplitude of the crankshaft speed signal (e.g., by coefficients 336a, 336b, 336c, etc.) to obtain a second modified crankshaft speed signal and comparing the second modified crankshaft speed signal to a second set of thresholds. The method 400 then returns to 420 where this comparison is used to determine whether a third consecutive misfire has occurred. This process is then repeatable for up to N/2 consecutive misfire detections, where N is the total number of engine cylinders.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A misfire detection system for a vehicle, the system comprising:
    a crankshaft position sensor configured to generate a crankshaft speed signal indicative of a rotational speed of a crankshaft of an engine of the vehicle, wherein the crankshaft is connected to a device that mitigates vibrational disturbances at the crankshaft caused by misfires of the engine; and
    a controller configured to:
        detect that a first firing event of the engine is a first misfire based on the crankshaft speed signal;
        in response to detecting the first misfire, monitor a vibrational response of the crankshaft relative to the first detected misfire, including modifying an amplitude of the crankshaft speed signal to obtain a first modified crankshaft speed signal and comparing the first modified crankshaft speed signal to a first set of thresholds;
        detect that a consecutive second firing event of the engine is a second misfire based on the first modified crankshaft speed signal and the first set of thresholds; and
        in response to detecting the second misfire, reset the monitoring of the vibrational response of the crankshaft to monitor the vibrational response of the crankshaft relative to the second detected misfire and not the first detected misfire, including modifying the amplitude of the crankshaft speed signal to obtain a second modified crankshaft speed signal and comparing the second modified crankshaft speed signal to a second set of thresholds for subsequent misfire detection.

2. The system of claim 1, wherein the controller is further configured to determine whether a consecutive third firing event of the engine is a third misfire based on the second modified crankshaft speed signal and the second set of thresholds.

3. The system of claim 1, wherein the resetting causes a shift or delay in the monitoring of the vibrational response of the crankshaft to a point or time of the second detected misfire to prevent at least one of a false positive misfire detection and a false negative misfire detection.

4. The system of claim 1, wherein the first and second sets of thresholds are the same.

5. The system of claim 1, wherein the first and second sets of thresholds are different and are each calibrated based on empirical data.

6. The system of claim 1, wherein the device that mitigates vibrational disturbances at the crankshaft comprises at least one of an electric motor connected to the crankshaft and a dual mass damper flywheel connected to the crankshaft.

7. The system of claim 6, wherein the vehicle is a hybrid electric vehicle (HEV) comprising only the electric motor connected to the crankshaft.

8. The system of claim 6, wherein the vehicle is a hybrid electric vehicle (HEV) comprising the dual mass damper flywheel connected between the crankshaft and the electric motor.

9. The system of claim 6, wherein the controller is further configured to control the electric motor to mitigate the vibrational disturbances at the crankshaft in response to detecting each of the first and second misfires.

10. The system of claim 6, wherein the vehicle is a manual transmission vehicle having only the dual mass damper flywheel connected between the crankshaft and a manual transmission.

11. A misfire detection method for a vehicle, the method comprising:
    obtaining, by a controller and using a crankshaft position sensor, a crankshaft speed signal indicative of a rotational speed of a crankshaft of an engine of the vehicle, wherein the crankshaft is connected to a device that mitigates vibrational disturbances at the crankshaft caused by misfires of the engine;
    detecting, by the controller, that a first firing event of the engine is a first misfire based on the crankshaft speed signal;
    in response to detecting the first misfire, monitoring, by the controller, a vibrational response of the crankshaft relative to the first detected misfire, including modifying an amplitude of the crankshaft speed signal to obtain a first modified crankshaft speed signal and comparing the first modified crankshaft speed signal to a first set of thresholds;
    detecting, by the controller, that a consecutive second firing event of the engine is a second misfire based on the first modified crankshaft speed signal and the first set of thresholds; and
    in response to detecting the second misfire, resetting, by the controller, the monitoring of the vibrational response of the crankshaft to monitor the vibrational response of the crankshaft relative to the second detected misfire and not the first detected misfire, including modifying the amplitude of the crankshaft speed signal to obtain a second modified crankshaft speed signal and comparing the second modified crankshaft speed signal to a second set of thresholds for subsequent misfire detection.

12. The method of claim 11, further comprising determining, by the controller, whether a consecutive third firing event of the engine is a third misfire based on the second modified crankshaft speed signal and the second set of thresholds.

13. The method of claim 11, wherein the resetting causes a shift or delay in the monitoring of the vibrational response of the crankshaft to a point or time of the second detected misfire to prevent at least one of a false positive misfire detection and a false negative misfire detection.

14. The method of claim 11, wherein the first and second sets of thresholds are the same.

15. The method of claim 11, wherein the first and second sets of thresholds are different and are each calibrated based on empirical data.

16. The method of claim 11, wherein the device that mitigates vibrational disturbances at the crankshaft comprises at least one of an electric motor connected to the crankshaft and a dual mass damper flywheel connected to the crankshaft.

17. The method of claim 16, wherein the vehicle is a hybrid electric vehicle (HEV) comprising only the electric motor connected to the crankshaft.

18. The method of claim 16, wherein the vehicle is a hybrid electric vehicle (HEV) comprising the dual mass damper flywheel connected between the crankshaft and the electric motor.

19. The method of claim 16, further comprising controlling, by the controller, the electric motor to mitigate the vibrational disturbances at the crankshaft in response to detecting each of the first and second misfires.

20. The method of claim 16, wherein the vehicle is a manual transmission vehicle having only the dual mass damper flywheel connected between the crankshaft and a manual transmission.

\* \* \* \* \*